United States Patent [19]
Liner

[11] 3,796,545
[45] Mar. 12, 1974

[54] DEVICE FOR PREPARING ELEMENTAL CARBON ENRICHED IN CARBON-13

[76] Inventor: Jerome C. Liner, 1430 Beaverton, Cincinnati, Ohio

[22] Filed: Feb. 23, 1972

[21] Appl. No.: 228,615

[52] U.S. Cl............... 23/259.5, 23/252 R, 23/264, 23/294, 423/445, 423/458, 423/459
[51] Int. Cl............................................. C10b 57/00
[58] Field of Search..................... 55/440, 158, 420; 23/259.5, 294, 252 R, 264; 423/445, 455, 458, 459, 493

[56] References Cited
UNITED STATES PATENTS
3,690,846  9/1972  Shin-ichi Akai et al............. 23/294
2,705,186  3/1955  Hardy et al...................... 23/294 X
2,171,574  9/1939  Lambert et al.................. 55/440 X OTHER PUBLICATIONS
Isotopic Carbon by Melvin Calvin, John Wiley & Sons, Inc.; New York 1949 p. 116.

Primary Examiner—Morris O. Wolk
Assistant Examiner—Arnold Turk
Attorney, Agent, or Firm—John A. Horan; Ignacio Resendez

[57] ABSTRACT

Apparatus for use in preparing elemental carbon comprising a tubular member having an apertured wall portion separating the member into first and second chambers with means disposed on said apertured wall portion to facilitate passage of a fluid released from first chamber into second chamber and impede return of the fluid to the first chamber.

3 Claims, 5 Drawing Figures

DEVICE FOR PREPARING ELEMENTAL CARBON ENRICHED IN CARBON-13

BACKGROUND OF INVENTION

A problem exists in fulfilling industrial and research needs for elemental carbon-13 ($^{13}C$). This problem is a result of an unavailability of a method and equipment to provide efficient and quantity production of $^{13}C$. Although carbon-13 enriched chemical compound are readily available, such as methane, carbon dioxide or barium carbonate, each containing about 90 percent carbon-13, the elemental form of carbon-13 is more difficult to obtain.

A typical process for preparing elemental carbon-13 may involve placing iron particles or filings in a porcelain boat in a quartz reaction tube, and then passing carbon dioxide enriched in carbon-13 and hydrogen into the reaction test chamber. Contact of the gases with the iron particles results in a reduction of the carbon dioxide to elemental carbon on top of the iron. Gaseous hydrogen chloride is thereafter flowed into the reaction chamber and forms ferrous chloride which then sublimes out of the porcelain boat and out of the reaction chamber.

This process has several disadvantages including being restricted to very small quantities of elemental carbon being produced, back diffusion of ferrous chloride which substantially decreases the purity of the elemental carbon, and the requirement of several passes of hydrogen chloride gas for sublimation and removal of the iron chloride.

SUMMARY OF INVENTION

In view of problems and disadvantages such as outlined above, it is an object of this invention to provide an apparatus that yields efficient and greater quantity conversion of carbon-13 contained in carbon dioxide enriched in carbon-13 to elemental carbon-13.

It is an object of this invention to provide an apparatus which yields relatively large quantities of high purity elemental carbon-13 product.

It is an object of this invention to provide an apparatus which minimizes or impedes back diffusion of ferrous chloride.

Various other objects and advantages will appear from the following description of the invention and are particularly pointed out hereinafter in connection with the appended claims. Various changes in design, materials, etc., as described herein may be made by those skilled in the art without departing from the scope and principles of this invention as brought out in the appended claims.

The invention comprises an enclosure separated by an apertured wall portion into two chambers, and means to facilitate passage of a reaction product in one direction but to retard or generally prevent or impede passage of the reaction product in the opposite direction.

DETAILED DESCRIPTION

Figure 1:
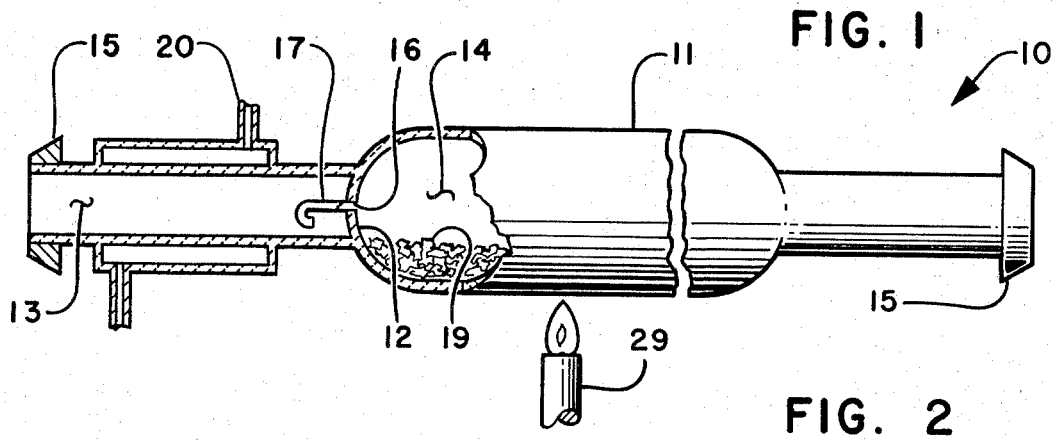
FIG. 1 is a partly cross-sectional view of one embodiment of this invention.
Figure 1A:
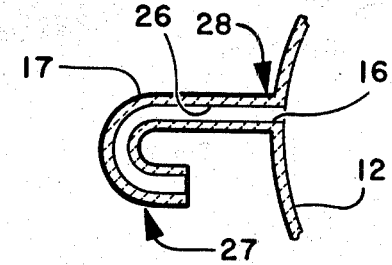
FIG. 1a is an enlarged cross section of conduit 17 of FIG. 1.

FIG. 1 illustrates one embodiment of this device 10. In FIG. 1 the elongated generally tubular housing or member 11, which may be made of quartz or any other suitable material, has transversely disposed therein an apertured wall portion 12 which forms with the tubular member separate first and second chambers 14 and 13 respectively. Member 11 may have disposed at either end connecting means 15, such as a balljoint, so as to incorporate device 10 in a processing sequence. Disposed over, in alignment and in communication with the aperture 16 of wall portion 12, and extending therefrom and projecting into and terminating within a downstream or second chamber 13, is an open-ended, restricting conduit means 17, as shown in FIG. 1a, designed to facilitate passage of, or to conduct, released fluids (not shown) from first or upstream chamber 14 into second or downstream chamber 13, and to prevent, impede or retard return of this product or fluids from second or downstream chamber 13 to first chamber 14. It has been found that a suitable means 17 comprises a capillary or small diameter tube with a passageway 26 (shown in greater detail in FIG. 1a) of from about 1 mm to about 3 mm inner diameter which also has a generally U-shaped configuration with open end disposed toward wall portion 12 in said second chamber 13, with the tube 17 having a radius of the arc of the U-shaped portion of the conduit of about 10 mm and extending about 40 mm into second chamber 13. Means 17 includes an inlet portion 28 communicating through aperture 16 with chamber 14 and an outlet portion 27 communicating with chamber 13 disposed by said U-shape in a direction opposite to the normal flow of process gas through chamber 13. The geometrical configuration of the capillary tube generally aids in preventing or impeding return of released product into first chamber 14. The device 10 is used in a generally horizontal position so as to enable the particles 19 disposed in chamber 14 to remain positioned on the side and not interfere with passageway of means 17. Means 17, in effect, acts as a oneway valve allowing passage of formed gas but effectively preventing its return. A suitable cooling means 20, such as a water jacket, may be disposed adjacent to and generally surrounding second chamber 13. The cooling means may condense the fluids or products released from first chamber 14 subsequent to passage through aperture 16 and conduit or means 17 so as to assist in preventing or impeding return of the product to first chamber 14 through conduit or means 17.

Figure 2:
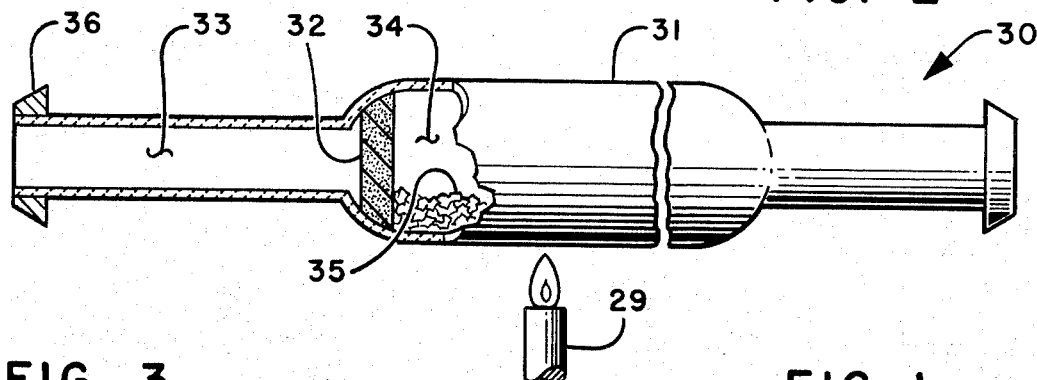
FIG. 2 is a partly cross-sectional view of one embodiment of a device which may be used for the reduction of carbon dioxide to elemental carbon.

FIG. 2 is a partly cross-sectional view of a device 30 which may be used with this invention as will be described below. In FIG. 2, generally tubular housing or member 31 may have a sintered glass wall portion 32 with pore size ranging from about 90 microns to about 200 microns which may separate the tubular member 31 into two separate chambers — a first or upstream chamber 34 and a second or downstream chamber 33.

Sintered glass wall portion 32 prevents passage of particles (such as particles 35) greater than about 200 microns into chamber 33. Member 31 also may have disposed at either end connecting means 36, similar to means 15 in FIG. 1, to interconnect body 30 in a processing sequence.

Figure 3:
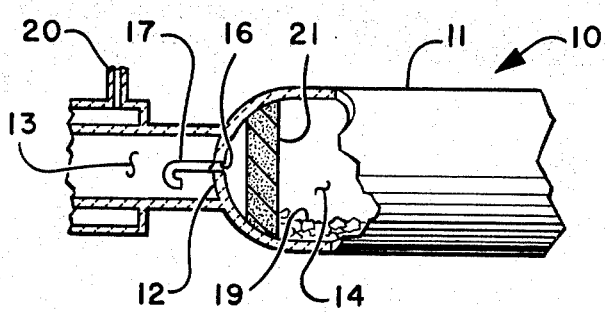
FIG. 3 is a cross-sectional view of a preferred embodiment of this invention.

As shown in FIG. 3, a variation of embodiment 10 may also include a sintered glass wall 21 disposed intermediate said apertured wall portion 12 and first chamber 14 with similar pore openings as above. A benefit from such an embodiment as shown in FIG. 3 would be to prevent elemental carbon particles 19 or other particles from passing through or clogging aperture 16 and means 17 as will be more fully described below. Sintered glass wall 21, like glass wall portion 32, may be made from any suitable material and has micron size pores ranging from about 90 microns to about 200 microns so as to effect blockage of particles yet allow passage of fluids.

Figure 4:
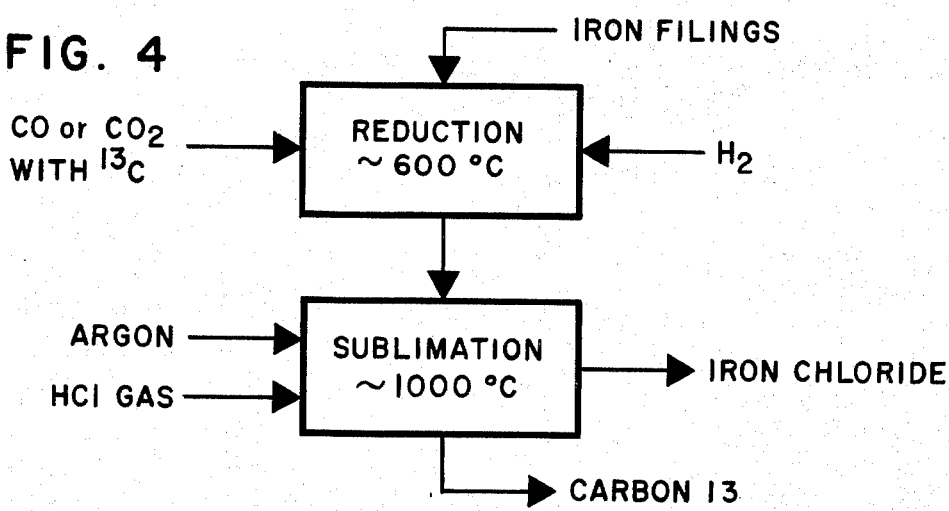
FIG. 4 illustrates a preferred processing sequence for conversion of carbon-13 in carbon dioxide or carbon monoxide to elemental carbon-13.

FIG. 4 illustrates a preferred processing sequence for obtaining carbon-13 from carbon-13 enriched carbon dioxide or carbon monoxide. As shown in FIG. 4, the conversion of carbon monoxide or carbon dioxide enriched in carbon-13 to elemental carbon-13 may be accomplished by first disposing iron filings or particles in chamber 14, or in chamber 34 using the device of FIG. 2. Another embodiment for this purpose is shown in FIG. 3 which combines wall portion 12 of FIGS. 1 and sintered glass wall portion 32 of FIG. 2. The chamber 14 (or 34 if embodiment of FIG. 2 is used) is heated to and maintained at about 600° C. Carbon-13 enriched carbon monoxide or carbon dioxide and hydrogen are passed into the desired reaction chamber which contains the iron filings. There may be a slight mole excess of hydrogen in the gas intermixture and a reduction to elemental carbon and water may be initiated and carried out. A constant pressure of carbon dioxide or carbon monoxide and hydrogen may be maintained in the reaction chamber at a partial pressure of about 500 Torr and 300 Torr respectively, for 4–6 hours. As elemental carbon is formed, methane formed in the reaction may be removed through chamber 13 (or chamber 33 if device 30 is used) by any suitable means, such as a cryogenic trap (not shown), and stored or reprocessed for subsequent conversion to elemental carbon.

The device 30 of FIG. 2 including first chamber 34 may be desirable for this initial reaction primarily because of ease of processing since gas flow and removal may be facilitated. If desired, the embodiment of FIG. 1 may be used. After conversion to elemental carbon, the iron particles having the elemental carbon thereon may be removed from first chamber 34 of the embodiment 30 of FIG. 2 and disposed within first chamber 14 of the device 10 of FIG. 1. If the conversion to elemental carbon was conducted in first chamber 14 of FIG. 1, removal may not be required. The embodiment illustrated in FIG. 3 incorporating sintered glass wall 21 may be used for both process steps and would likewise not require removal of the carbon layered iron filings. Anhydrous hydrogen chloride gas may then be introduced into the reaction or first chamber 14 to react with the iron to form ferrous chloride which may sublime out of first chamber 14 through means 17 into second chamber 13 wherein condensation occurs. Removal of ferrous chloride from chamber 14 is effected by gaseous pressure such as from hydrogen chloride which may be introduced at the rate of about 180 cc per minute with about 180 cc per minute of argon or other inert gas. Argon is preferred because it is relatively inexpensive yet is heavy enough to readily sweep the ferrous chloride from the chamber. The reaction chamber 14 is generally maintained at about 1,000° C by appropriate heating means 29, such as a heating coil or burner (shown diagrammatically by burner 29), during this reaction. The reaction may continue until ferrous chloride is no longer sublimed. Means 17 prevents the return of the ferrous chloride and thereby results in an elemental carbon-13 product of high purity. The generally U-shaped, or other similar configuration, feature of means 17 facilitates removal of product from first chamber 14 into second chamber 13 but not in reverse fashion. In FIG. 3, sintered glass wall 21 prevents the loss of elemental carbon particles. The tubular member 11 may then be flushed with argon and cooled to permit recovery of the elemental carbon enriched with carbon-13.

Using the device shown in FIG. 2 for the first reaction, i.e., the deposition of elemental carbon on the iron particles or filings, and the device of FIG. 1, which is the subject matter of this invention, for the sublimation of the iron particles, 30 to 40 gram batches of carbon-13 have been successfully produced. Larger recovery rates and batch sizes are limited only by the size and capacity of the apparatus used.

The device presented herein solves prior large quantity production difficulties and lack of purity problems while at the same time it enables efficient, quantitative recovery of high purity elemental carbon enriched in carbon-13.

What is claimed is:

1. A device for conversion of carbon-13 contained in carbon dioxide enriched in carbon-13 to elemental carbon-13 comprising an elongated, horizontal, generally tubular member having an open inlet mouth and an open outlet mouth, an apertured wall portion disposed transversely of said tubular member intermediate said open mouths and forming with the tubular member separate first heating chamber and second cooling chamber, and a generally U-shaped open-ended restricting conduit of interior diameter of from about 1 mm to about 3 mm in communication with the aperture of said wall portion and projecting into and terminating within said cooling chamber with said open end disposed towards said apertured wall portion, said conduit conducting fluids from the first chamber to the second chamber and impeding return of fluids from said second chamber to said first chamber, and cooling means adjoining said cooling chamber and spaced from said first chamber and said U-shaped restricting conduit to cool said fluids subsequent to passage through said conduit.

2. The device of claim 1 wherein said conduit extends about 40 mm into said second chamber and the radius of the arc of the U-shaped portion of the conduit is about 10 mm.

3. The device of claim 1 wherein a sintered glass wall portion is disposed intermediate said apertured wall portion and first chamber, with pores therein of size of from about 90 microns to about 200 microns.

* * * * *

UNITED STATES PATENT OFFICE
CERTIFICATE OF CORRECTION

Patent No. 3,796,545      Dated March 12, 1974

Inventor(s) Jerome C. Liner

It is certified that error appears in the above-identified patent and that said Letters Patent are hereby corrected as shown below:

after [76] add:

--[73] Assignee: The United States of America as represented by the United States Atomic Energy Commission Signed and sealed this 23rd day of July 1974.

(SEAL)
Attest:

McCOY M. GIBSON, JR.
Attesting Officer

C. MARSHALL DANN
Commissioner of Patents